(12) United States Patent
Jeyaseelan et al.

(10) Patent No.: US 8,457,628 B2
(45) Date of Patent: *Jun. 4, 2013

(54) WIRELESS NETWORK ROAMING TIMER METHOD AND APPARATUS

(75) Inventors: Jaya L Jeyaseelan, San Diego, CA (US); Nitin Gupta, Cypress, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/461,660

(22) Filed: May 1, 2012

(65) Prior Publication Data

US 2012/0214482 A1 Aug. 23, 2012

Related U.S. Application Data

(60) Continuation of application No. 13/159,785, filed on Jun. 14, 2011, now Pat. No. 8,190,152, which is a continuation of application No. 12/868,010, filed on Aug. 25, 2010, now abandoned, which is a division of application No. 10/675,007, filed on Sep. 30, 2003, now Pat. No. 7,844,266.

(51) Int. Cl.
*H04W 4/00* (2009.01)

(52) U.S. Cl.
USPC ............ 455/432.1; 455/67.11; 455/434; 455/41.2; 455/435.2; 370/338

(58) Field of Classification Search
USPC . 455/67.11, 432.1–442, 560–562.1; 370/328, 370/331, 338
See application file for complete search history.

(56) References Cited

U.S. PATENT DOCUMENTS

| | | | |
|---|---|---|---|
| 5,152,009 A | 9/1992 | Sato | |
| 5,353,331 A | 10/1994 | Emery et al. | |
| 5,432,841 A * | 7/1995 | Rimer | 455/457 |
| 5,717,688 A | 2/1998 | Belanger et al. | |
| 5,819,178 A | 10/1998 | Cropper | |
| 5,987,062 A | 11/1999 | Engwer et al. | |
| 5,995,829 A | 11/1999 | Broderick | |
| 6,052,598 A | 4/2000 | Rudrapatna et al. | |
| 6,119,001 A | 9/2000 | Delis et al. | |
| 6,192,245 B1 | 2/2001 | Jones et al. | |
| 6,233,454 B1 | 5/2001 | Sato | |
| 6,233,463 B1 | 5/2001 | Wiedeman et al. | |
| 6,330,444 B1 | 12/2001 | Rune et al. | |
| 6,580,700 B1 | 6/2003 | Pinard et al. | |

(Continued)

FOREIGN PATENT DOCUMENTS

| | | |
|---|---|---|
| CN | 1183014 | 5/1998 |
| EP | 1678970 | 8/2008 |
| WO | WO-2005034548 | 4/2005 |

OTHER PUBLICATIONS

Notice of Allowance and Fees for U.S. Appl. No. 12/868,010 Mailed Mar. 31, 2011, 10 pages.

(Continued)

*Primary Examiner* — Sharad Rampuria
(74) *Attorney, Agent, or Firm* — Schwegman, Lundberg & Woessner, P.A.; Gregory J. Gorrie

(57) ABSTRACT

A mobile station in a wireless network includes a roaming timer. The roaming timer is set based on various criteria, and when the roaming timer expires, an attempt to roam is performed.

24 Claims, 5 Drawing Sheets

U.S. PATENT DOCUMENTS

| | | | | |
|---|---|---|---|---|
| 6,668,167 | B2 * | 12/2003 | McDowell et al. | 455/412.1 |
| 7,020,439 | B2 | 3/2006 | Sinivaara et al. | |
| 7,065,063 | B2 | 6/2006 | Tran | |
| 7,406,319 | B2 | 7/2008 | Kostic et al. | |
| 7,440,756 | B1 * | 10/2008 | Wang et al. | 455/436 |
| 7,633,915 | B1 | 12/2009 | Lewis | |
| 7,706,790 | B2 | 4/2010 | Dunn et al. | |
| 7,738,876 | B1 | 6/2010 | Radhakrishnan et al. | |
| 7,844,057 | B2 | 11/2010 | Meier et al. | |
| 7,844,266 | B2 * | 11/2010 | Jeyaseelan et al. | 455/432.1 |
| 7,873,358 | B2 | 1/2011 | Jiang | |
| 8,064,903 | B2 * | 11/2011 | Pathan et al. | 455/432.1 |
| 8,190,152 | B2 * | 5/2012 | Jeyaseelan et al. | 455/432.1 |
| 2002/0025810 | A1 | 2/2002 | Takayama et al. | |
| 2003/0069016 | A1 | 4/2003 | Bahl et al. | |
| 2004/0039817 | A1 | 2/2004 | Lee et al. | |
| 2005/0070275 | A1 | 3/2005 | Jeyaseelan et al. | |
| 2005/0148328 | A1 | 7/2005 | Pathan et al. | |
| 2006/0187873 | A1 | 8/2006 | Friday et al. | |
| 2008/0286400 | A1 | 11/2008 | Morrill et al. | |
| 2010/0110890 | A1 | 5/2010 | Rainer et al. | |
| 2010/0136969 | A1 * | 6/2010 | Nader et al. | 455/434 |

OTHER PUBLICATIONS

Non-Final Office Action for Chinese Patent Application No. 201010158602.1 Mailed Jan. 26, 2011, 9 pages.

Non-Final Office Action for U.S. Appl. No. 12/868,010 Mailed Dec. 17, 2010, 12 pages.

Final Office Action for U.S. Appl. No. 10/675,007 Mailed Sep. 11, 2007, 13 Pages.

International Preliminary Report on Patentability for PCT Application No. PCT/US2004/032441 Mailed Apr. 3, 2006, 11 Pages.

Non-Final Office Action for European Patent Application No. 04789462.1 Mailed Jul. 9, 2007, 12 Pages.

Non-Final Office Action for Malaysian Patent Application No. PI 20043464 Mailed Dec. 31, 2007, 3 Pages.

Non-Final Office Action for Malaysian Patent Application No. PI 20043464 Mailed Oct. 2, 2009, 3 Pages.

Non-Final Office Action for Chinese Patent Application No. 200480027133.2 Mailed Dec. 5, 2008, 13 Pages.

Non-Final Office Action for Chinese Patent Application No. 200480027133.2 Mailed Aug. 1, 2008, 26 Pages.

Non-Final Office Action for Chinese Patent Application No. 200480027133.2 Mailed Jan. 4, 2008, 24 Pages.

Non-Final Office Action for U.S. Appl. No. 10/675,007 Mailed Feb. 3, 2006, 12 Pages.

Written Opinion for PCT Application No. PCT/US2004/032441 Mailed Jan. 24, 2005, 10 Pages.

International Search Report for PCT Application No. PCT/US2004/032441 Mailed Jan. 24, 2005, 8 Pages.

Notice of Allowance and Fees for U.S. Appl. No. 10/675,007 Mailed Jul. 22, 2010, 10 Pages.

Non-Final Office Action for U.S. Appl. No. 10/675,007 Mailed Mar. 29, 2010, 20 Pages.

Non-Final Office Action for U.S. Appl. No. 10/675,007 Mailed Mar. 8, 2007, 13 Pages.

Final Office Action for U.S. Appl. No. 10/675,007 Mailed Jul. 17, 2006, 12 Pages.

Lee, Dong-Jun, et al., "On Optimum Timer Value of Area and Timer-Based Location Registration Scheme", IEEE Communication Letters, vol. 5, No. 4, Apr. 2001, 3 Pages.

Wang, Lan , et al., "Integration of SNR, Load and Time in Handoff Initiation for Wireless LAN", 14th IEE 2003 International Symposium on Personal, Indoor & Mobile Radio Communication Proceedings, vol. 2, Sep. 7, 2003, 5 Pages.

Non-Final Office Action for Malaysian Patent Application No. PI 20043464 Mailed Nov. 15, 2011, 2 Pages.

Notice of Allowance and Fees for U.S. Appl. No. 13/159,785 Mailed Feb. 1, 2012, 8 Pages.

Non-Final Office Action for U.S. Appl. No. 13/159,785 Mailed Oct. 17, 2011, 9 Pages.

Non-Final Office Action for Chinese Patent Application No. 201010158602.1 Mailed Apr. 6, 2012, 9 pages.

* cited by examiner

WIRELESS NETWORK ROAMING TIMER METHOD AND APPARATUS

RELATED APPLICATION

This application which claims priority to and is a continuation application of U.S. application Ser. No. 13/159,785, filed on Jun. 14, 2011, now issued as U.S. Pat. No. 8,190,152, which claims priority to and is a continuation application of U.S. application Ser. No. 12/868,010, filed on Aug. 25, 2010, which claims priority to and is a divisional application of U.S. application Ser. No. 10/675,007, filed on Sep. 30, 2003, now issued as U.S. Pat. No. 7,844,266 on Nov. 20, 2010, all of which are incorporated herein by reference in their entireties.

FIELD

The present invention relates generally to computer networks, and more specifically to wireless networks.

BACKGROUND

Wireless networks typically include mobile stations and access points. A mobile station may "associate" with an access point (referred to herein as the "current access point") to communicate with other devices on the network. Mobile stations may move about while access points are typically stationary. If a mobile station moves around in an area covered by multiple access points, the mobile station may "disassociate" from the current access point and associate with another. The process of disassociation and association may be repeated any number of times, as the mobile station moves about.

In order to decide whether or not to disassociate from the current access point or associate with a different access point, a mobile station may periodically communicate with a variety of access points, including access points other than the current access point. When a mobile station communicates with access points other than the current access point, the data throughput between the mobile station and the current access point may suffer.

DESCRIPTION OF EMBODIMENTS

Figure 1:
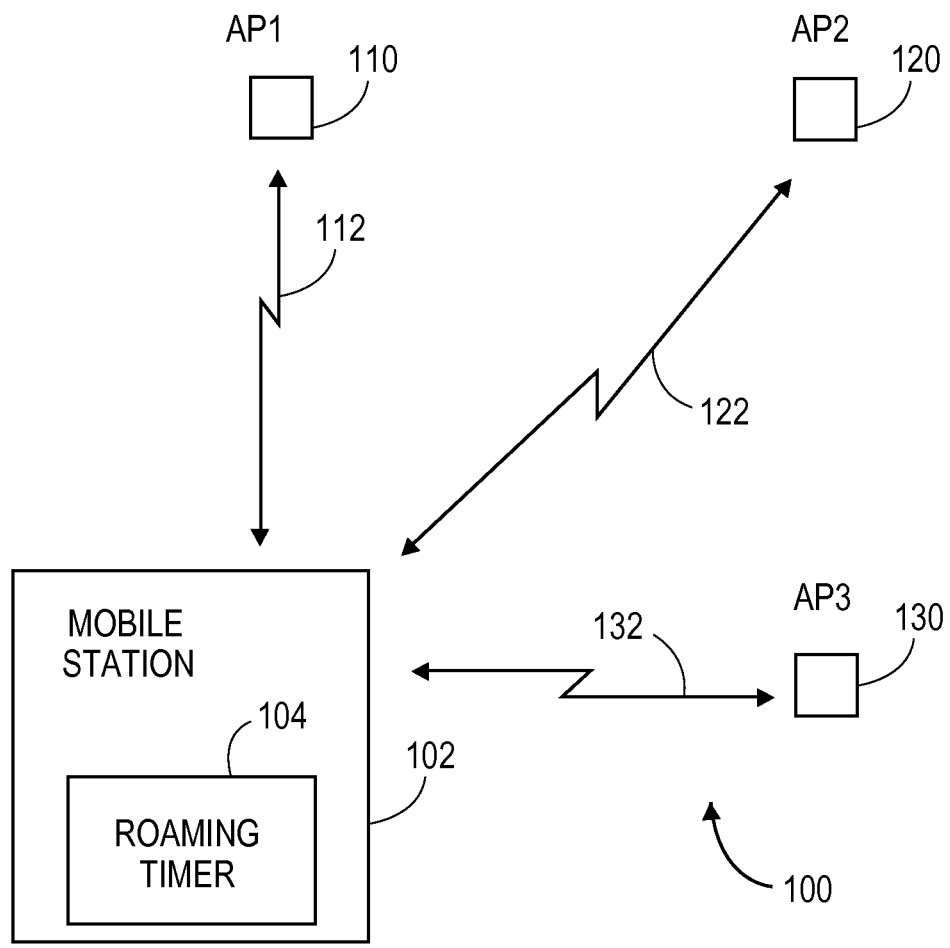
FIG. 1 shows a diagram of a wireless network.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a diagram of a wireless network. Wireless network 100 includes mobile station 102 and access points (AP) 110, 120, and 130. In some embodiments, wireless network 100 is a wireless local area network (WLAN). For example, access points 110, 120, and 130, and mobile station 102 may operate in compliance with a wireless network standard such as ANSI/IEEE Std. 802.11, 1999 Edition, although this is not a limitation of the present invention.

Mobile station 102 is shown communicating with access point 110 using signal 112, access point 120 using signal 122, and access point 130 using signal 132. Mobile station 102 may associate with one of the access points for data communications, and may also communicate with other access points to decide if it should end the current association and associate with another access point. For example, mobile station 102 may be associated with access point 110. When a current association exists between mobile station 102 and access point 110, signal 112 allows data to be communicated between mobile station 102 and access point 110.

Mobile station 102 may periodically "roam," or "attempt to roam." As used herein, the terms "roam" and "attempt to roam" refer to the actions taken by a mobile station when deciding whether to end a current association ("disassociate") and make a new association with a different access point. In some instances, roaming occurs when a mobile station performs a scan of available access points and decides to disassociate with the current access point and re-associate with a different access point. In other instances, an attempt to roam occurs when a mobile station performs a scan of available access points, and does not disassociate with the current access point. This may occur when the mobile station scans to see if a "better" access point is available, and decides to maintain the current association rather than disassociate with the current access point.

Roaming, or attempting to roam, may reduce the data throughput of the current association. For example, if mobile station 102 attempts to roam to check the availability of access points 120 and 130, the data throughput of the current association with access point 110 may be reduced.

Mobile station 102 includes roaming timer 104. A roaming timer, as defined herein, is a timer that may be used to put off an attempt to roam based on various criteria. For example, if the current association is perceived to be of "high quality," roaming timer 104 may be set to a relatively large value, and any roaming attempts by mobile station 102 may be delayed, or "put off," in time until the timer expires. In some embodiments, the timer may be repeatedly set or reset to continually delay any attempts to roam, or to force an attempt to roam immediately. Further, the roaming timer may be set to any value based on any criteria. The type or amount of criteria used to the set the timer should not be considered a limitation of the present invention.

Roaming timer 104 may be implemented using any of many different mechanisms. For example, roaming timer 104 may be a hardware timer or a software timer. In some embodiments, multiple hardware timers are utilized, where each is set to either the same or different values. In other embodiments, multiple software timers are utilized, where each is set to either the same or different values. A roaming attempt may occur when one of the multiple timers times out, or when all of the multiple timers times out.

The perceived quality of a current association may be defined by any parameter, metric, or combination of parameters or metrics. Various embodiments using different parameters and metrics are described below with reference to the remaining figures.

Figure 2:
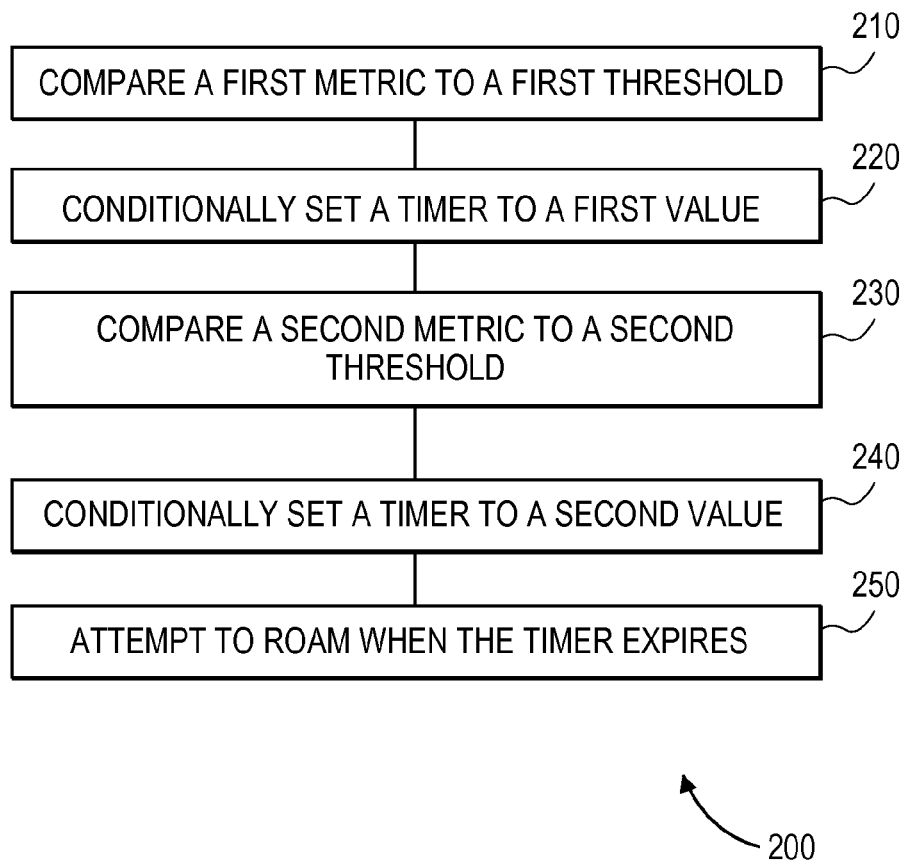
FIGS. 2 and 3 show flowcharts in accordance with various embodiments of the present invention.

FIG. 2 shows a flowchart in accordance with various embodiments of the present invention. In some embodiments, method 200 may be used to decide when to attempt to roam in a wireless network. In some embodiments, method 200, or portions thereof, is performed by a wireless network interface, a processor, or an electronic system, embodiments of which are shown in the various figures. Method 200 is not limited by the particular type of apparatus, software element, or person performing the method. The various actions in method 200 may be performed in the order presented, or may be performed in a different order. Further, in some embodiments, some actions listed in FIG. 2 are omitted from method 200.

Method 200 is shown beginning at block 210 in which a first metric is compared to a first threshold; and in block 220, a timer is conditionally set to a first value. The timer referred to in block 220 operates as a roaming timer, such as roaming timer 104 (FIG. 1). Rather than only attempting to roam at periodic intervals, the device performing method 200 may attempt to roam at various intervals based, at least in part, on the values to which the timer is set.

Utilizing a roaming timer to put off a roaming attempt may be useful in many different operational scenarios. For example, if during a current association with an access point, a mobile station enjoys a "high quality" connection, periodic attempts to roam may not be the most efficient use of the mobile station's resources. On the other hand, if a mobile station has a lower quality connection, the interval between roaming attempts may be modified to make more efficient use of the mobile station's resources.

In block 230, a second metric is compared to a second threshold, and in block 240, the timer is conditionally set to a second value. Various embodiments of the present invention are not limited to two metrics, two thresholds, and two timer values as shown in FIG. 2. For example, in some embodiments, many more than two metrics are utilized. Further, in some embodiments, a single metric is used, and the single metric is compared against multiple thresholds. The result of the comparison with multiple thresholds may result in setting a roaming timer with one of many different possible timer values.

In block 250, an attempt to roam is made when the timer expires. In some embodiments, the timer runs in the "background." For example, in embodiments that include a hardware timer, the hardware may be adapted to decrement a counter every clock cycle or every N clock cycles. The counter may perform as a roaming timer when loaded with a timer value, and the counter is decremented in the background. In other embodiments that include a hardware timer, the counter is only decremented when enabled, and various method embodiments of the present invention not only set the timer, but also enable and disable the timer. When the timer times out, the roaming attempt may be initiated in one of many different ways. For example, the hardware timer may cause a processor interrupt, or may set a bit in a status register. The present invention is not limited in this respect.

In embodiments that include a software timer, the software timer may be implemented as a software counter that is decremented in the background. For example, a software routine may be scheduled to run every second, or every 100 milliseconds, and each time the software routine runs, it may decrement the counter that functions as the roaming timer. Further, the software counter may be enabled or disabled in support of the operation of the roaming timer. The interval between successive decrement operations of the counter is not a limitation of the present invention.

In some embodiments, method 200 may be performed periodically. For example, method 200 may run every second or every ten seconds in a mobile station, such as mobile station 102 (FIG. 1). As a result, roaming attempts may be put off indefinitely, or may be performed at intervals defined, at least in part, by the timer values.

Figure 3:
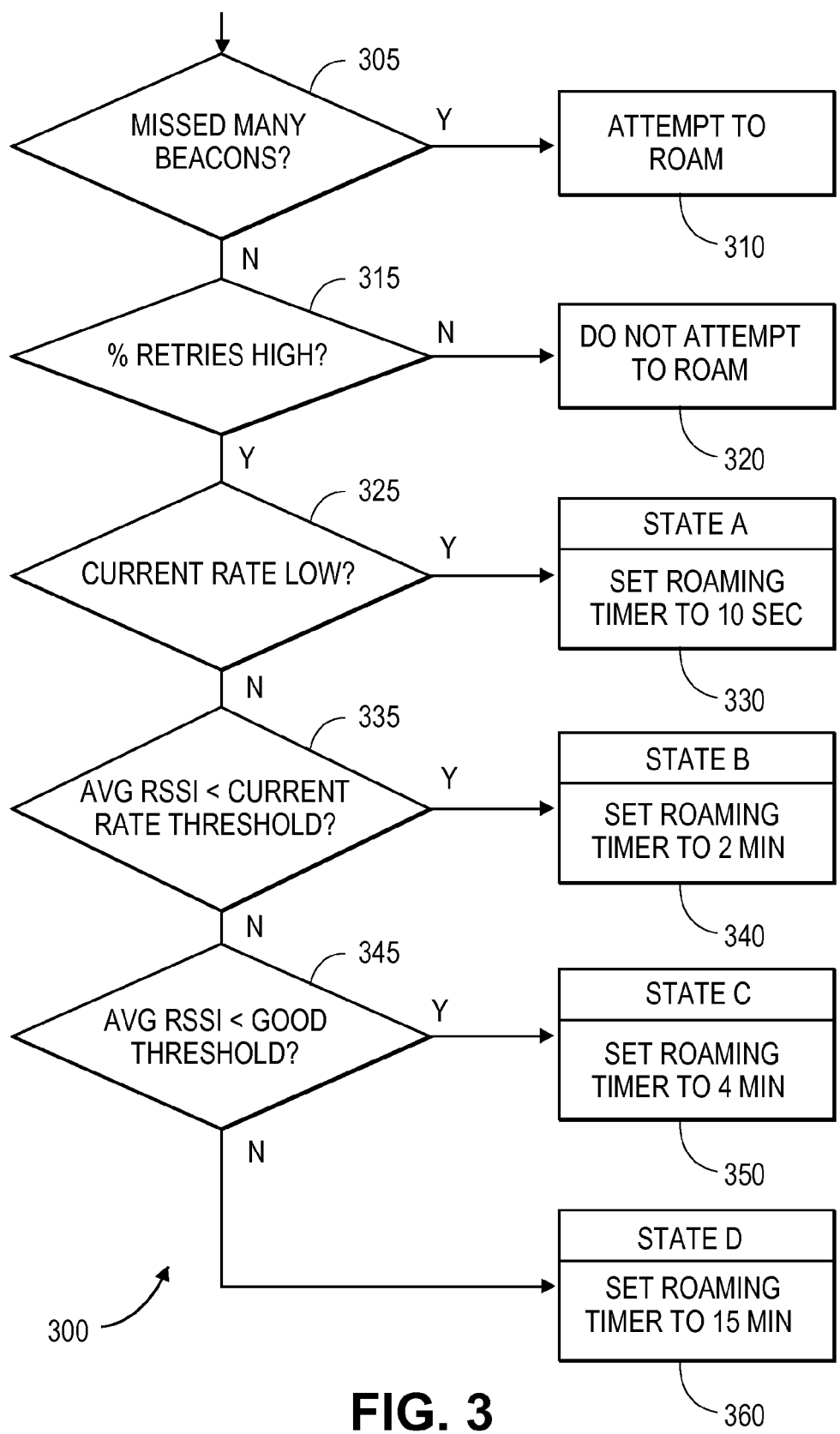

FIG. 3 shows a flowchart in accordance with various embodiments of the present invention. In some embodiments, method 300 may be used to decide when to attempt to roam in a wireless network. In some embodiments, method 300, or portions thereof, is performed by a wireless network interface, a processor, or an electronic system, embodiments of which are shown in the various figures. Method 300 is not limited by the particular type of apparatus, software element, or person performing the method. The various actions in method 300 may be performed in the order presented, or may be performed in a different order. Further, in some embodiments, some actions listed in FIG. 3 are omitted from method 300.

Method 300 is shown beginning at block 305 in which a first metric is compared to a threshold. The metric includes a determination of how many "beacons" have been missed. In some embodiments, a beacon is a packet or frame periodically transmitted by an access point. If many beacons have been missed by a mobile station, this may be indicative of a poor quality connection between the mobile station and the access point. As shown in FIG. 3, if many beacons have been missed, an attempt to roam may be performed at 310.

The attempt to roam at 310 may be performed by resetting a roaming timer, or by performing an attempt to roam regardless of the state of the roaming timer. The number of missed beacons used as a threshold in block 305 may be set to any threshold. In some embodiments, if more than 50% of beacons are missed, an attempt to roam is performed at block 310. In other embodiments, if more than 60% of beacons are missed, an attempt to roam is performed at block 310. The particular threshold used in block 305 is not a limitation of the present invention.

At 315, a percentage of "retries" is checked, and if it is not high, then method 200 ends with a determination to not attempt roaming at block 320. A "retry" corresponds to a packet or frame that is retransmitted because of a previously unsuccessful attempt at transmission. The percentage of retries represents a metric that can be either gathered or calculated, and the number to which the percentage is compared represents a threshold. The actual percentage used as a threshold is not a limitation of the present invention.

The remaining decision blocks (325, 335, and 345) compare a metric against a threshold, and conditionally enter one of four states (330, 340, 350, or 360) depending on the outcome of the decisions. Although three decision blocks and four states are shown, any number of decision blocks and states may be implemented without departing from the scope of the present invention.

Decision block 325 compares a current data rate to a threshold. In some embodiments, the threshold is the lowest data rate available. For example, in some embodiments, the mobile station will reduce the data rate as the distance to the access point increases, or as the received signal strength decreases. If the current data rate corresponds to the lowest rate available, then if the signal degrades further, the mobile station may be forced to disassociate. If the current rate is low, then method 300 enters STATE A (block 330) where the roaming timer is set to 10 seconds.

Block 330 is referred to as a "state" in part because, if in subsequent invocations of method 300, STATE A is re-entered, then the timer is not necessarily set to 10 seconds again. For example, assuming that method 300 is performed once a second, and each time it is performed block 330 is reached, the first time block 330 is reached, STATE A will be entered, and the roaming timer will be set to 10 seconds. The second time block 330 is reached, the roaming timer will not be set, because STATE A has remained the active state. In this example, method 300 will be performed 10 times, block 330 will be reached each time, the roaming timer will expire, and an attempt to roam will be performed.

If, in method 300, decision block 335 is reached, an average received signal strength indicator (RSSI) is compared against a threshold. In block 335, the RSSI is the metric, and the "current rate threshold" is the threshold to which the metric is compared. If the average RSSI is less than the current rate threshold, then block 340 is reached, and if the current state is not STATE B, STATE B is entered, and the roaming timer is set to two minutes. If block 340 was reached the last time that method 300 was performed, then the current state remains STATE B, and the timer is not necessarily set. If block 340 is reached each time method 300 is performed over a two minute period, the timer will expire, and an attempt to roam will be performed.

Figure 4:
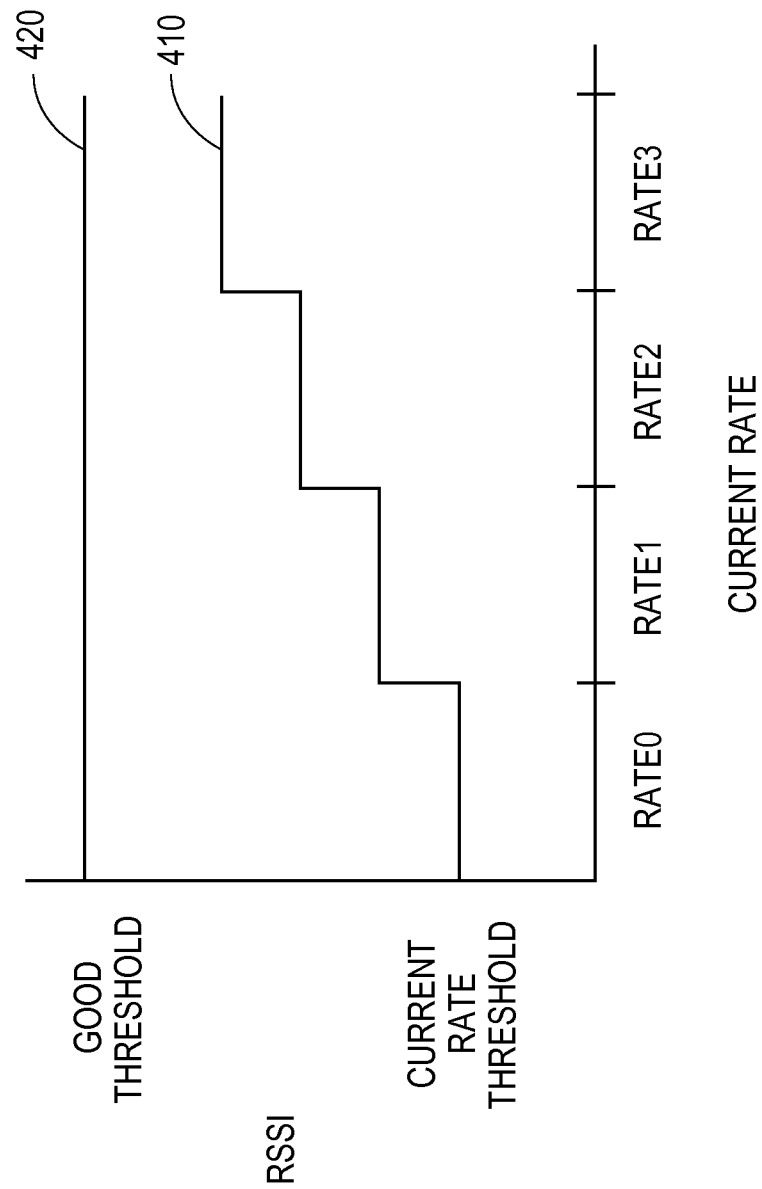
FIG. 4 shows a plot with various received signal strength indicator thresholds.

An example of a "current rate threshold" is shown in FIG. 4 at 410. As shown in FIG. 4, the current rate threshold may vary as a function of the current rate. Four current rate threshold values are shown in FIG. 4, each corresponding to a different rate. Any number of current rate thresholds may exist without departing from the scope of the present invention. In some embodiments, the thresholds are different as shown in FIG. 4, and in other embodiments, the thresholds are the same.

Referring now back to FIG. 3, if decision block 345 is reached, an average received signal strength indicator (RSSI) is compared against a second threshold. In block 345, the RSSI is the metric, and the "good threshold" is the threshold to which the metric is compared. If the average RSSI is less than the good threshold, then block 350 is reached, and if the current state is not STATE C, STATE C is entered, and the roaming timer is set to four minutes. If block 350 was reached the last time that method 300 was performed, then the current state remains STATE C, and the timer is not necessarily set. If block 350 is reached each time method 300 is performed over a four minute period, the timer will expire, and an attempt to roam will be performed.

If in block 345, the average RSSI is not below the good threshold, then block 360 is reached, and if the current state is not STATE D, STATE D is entered, and the roaming timer is set to fifteen minutes. If block 360 was reached the last time that method 300 was performed, then the current state remains STATE D, and the timer is not necessarily set. If block 360 is reached each time method 300 is performed over a fifteen minute period, the timer will expire, and an attempt to roam will be performed.

An example of a "good threshold" is shown in FIG. 4 at 420. As shown in FIG. 4, the good threshold does not vary as a function of the current rate, but this is not a limitation of the present invention. For example, in some embodiments the good threshold may vary as a function of current rate, similar to the current rate threshold shown at 410.

In some embodiments, method 300 is performed periodically within a mobile station such as mobile station 102 (FIG. 1). For example, method 300 may be performed once a second, or once every ten seconds. In some embodiments, each time method 300 is performed, the roaming timer is either set to a value or decremented. In other embodiments, the roaming timer is decremented in the background, and method 300 either sets the roaming timer, or performs no operation on the roaming timer.

Method 300 allows a mobile station to measure a "perceived quality" of a current connection. The perceived quality of the connection is based on various metrics as shown in method 300. In some embodiments, the roaming timer is set to a relatively high value when the perceived quality is high. Also in some embodiments, the roaming timer is set to a relatively low value when the perceived quality is lower.

FIG. 4 shows a plot with various received signal strength indicator thresholds. The vertical axis corresponds to thresholds for comparison against the received signal strength indicator (RSSI). The horizontal axis represents data rates. As shown in FIG. 4, the current rate threshold is a function of the current data rate, and the good threshold is constant. In some embodiments, more than two types of thresholds are utilized, and in some embodiments, more than one threshold is a function of data rate.

Figure 5:
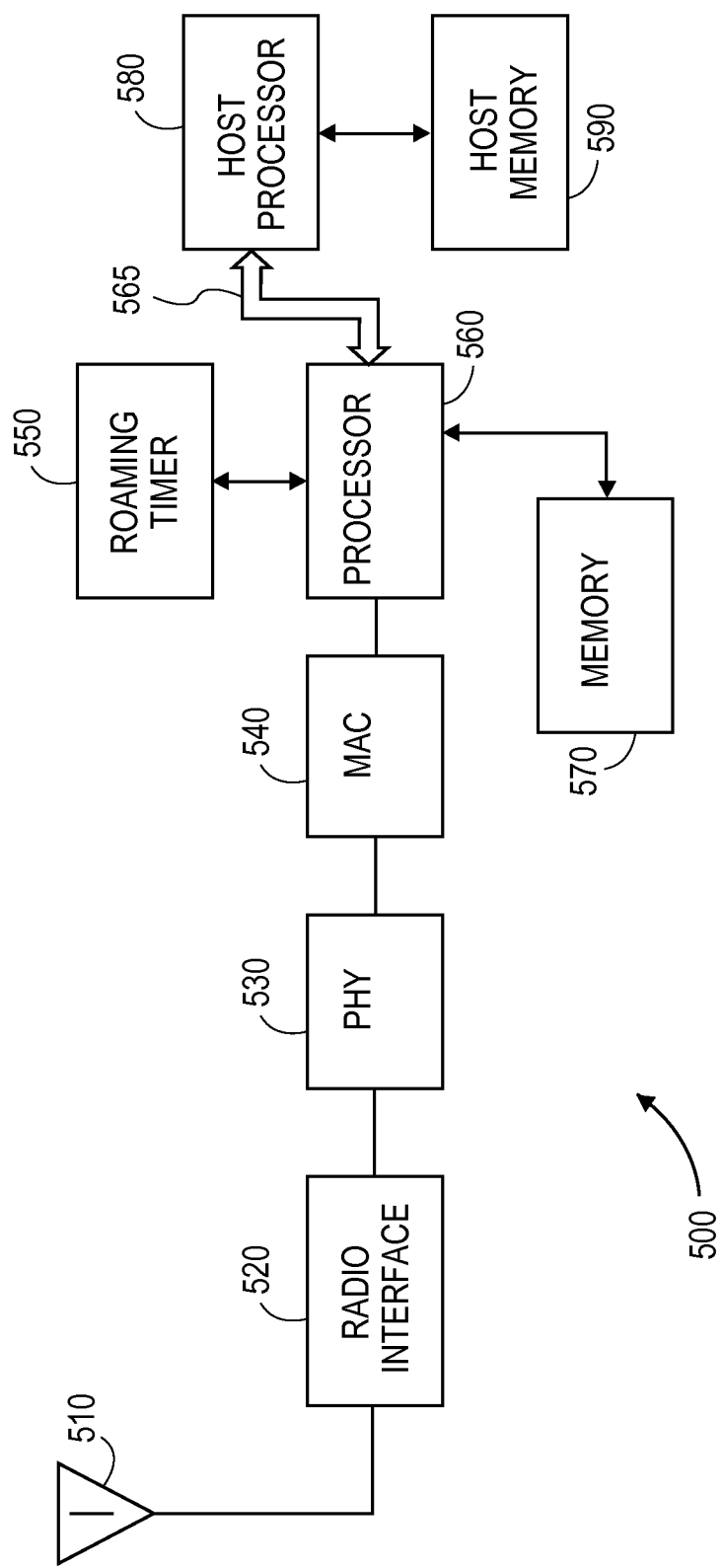
FIG. 5 shows a system diagram in accordance with various embodiments of the present invention.

FIG. 5 shows a system diagram in accordance with various embodiments of the present invention. Electronic system 500 includes antenna 510, radio interface 520, physical layer (PHY) 530, media access control layer (MAC) 540, processor 560, roaming timer 550, and memory 570. Electronic system 500 also includes host processor 580 and host memory 590. In operation, system 500 sends and receives signals using antenna 510, and the signals are processed by the various elements shown in FIG. 5. Antenna 510 may be a directional antenna or an omni-directional antenna. As used herein, the term omni-directional antenna refers to any antenna having a substantially uniform pattern in at least one plane. For example, in some embodiments, antenna 510 may be an omni-directional antenna such as a dipole antenna, or a quarter wave antenna. Also for example, in some embodiments, antenna 510 may be a directional antenna such as a parabolic dish antenna or a Yagi antenna.

Host processor 580 is coupled to processor 560 by bus 565. The blocks shown to the left of bus 565 may be an apparatus such as a wireless network interface, and the blocks shown to the right of bus 565 may be an apparatus or system such as a laptop computer. The wireless interface may be on a card that plugs into the laptop computer, or may be a wireless interface that is integral with the computer. In some embodiment, bus 565 represents a communications bus such as a peripheral component interconnect (PCI) bus, however this is not a limitation of the present invention.

Radio interface 520 may include circuitry to support the transmission and reception of radio frequency (RF) signals. For example, in some embodiments, radio interface 520 includes an RF receiver to receive signals and perform "front end" processing such as low noise amplification (LNA), filtering, frequency conversion or the like. Also for example, in some embodiments, radio interface 520 includes circuits to support frequency up-conversion, and an RF transmitter. The invention is not limited by the contents or function of radio interface 520.

Physical layer (PHY) 530 may be any suitable physical layer implementation. For example, PHY 530 may be a circuit block that implements a physical layer that complies with the IEEE 802.11 standard or other standard. Examples include, but are not limited to, direct sequence spread spectrum (DSSS), frequency hopping spread spectrum (FHSS), and orthogonal frequency division multiplexing (OFDM).

Media access control layer (MAC) 540 may be any suitable media access control layer implementation. For example, MAC 540 may be implemented in software, or hardware or any combination thereof. In some embodiments, MAC 540 may be implemented in software that is partially executed by processor 560 and partially executed by host processor 580.

Roaming timer 550 may be a timer utilized to put off a decision to roam, such as roaming timer 104 (FIG. 1). Roaming timer 550 may be implemented in hardware or software or any combination. In some embodiments, roaming timer 550 is set to various values, and when the timer expires, an attempt to roam is performed. For example, methods such as method 200 (FIG. 2) and method 300 (FIG. 3) may be used to compare metrics to thresholds and conditionally set roaming timer 550. In some embodiments, roaming timer 550 may be coupled to (or implemented by) processor 560. In other embodiments, roaming timer 550 may be coupled to (or implemented by) host processor 580.

Processor 560 may be a processor that sets roaming timer 550 based, at least in part, on comparisons between metrics and thresholds. For example, processor 560 may perform methods such as method 200 (FIG. 2) or method 300 (FIG. 3). Processor 560 represents any type of processor, including but not limited to, a microprocessor, a digital signal processor, a microcontroller, or the like. In some embodiments, processor 560 does not exist, and dedicated digital logic or other hardware is coupled to roaming timer 550. In these embodiments, the dedicated digital logic or other hardware may set roaming timer 550 based, at least in part, on comparisons between metrics and thresholds.

Memory 570 represents an article that includes a machine readable medium. For example, memory 570 represents a random access memory (RAM), dynamic random access memory (DRAM), static random access memory (SRAM), read only memory (ROM), flash memory, or any other type of article that includes a medium readable by processor 560. Memory 570 can store instructions for performing the execution of the various method embodiments of the present invention.

Host processor 580 may be any processor capable of communication with processor 560 over bus 565. Host processor 580 represents any type of processor, including but not limited to, a microprocessor, a personal computer, a workstation, or the like. In some embodiments, host processor 580 may set a roaming timer. For example, host processor 580 may implement MAC 540 or a portion of MAC 540 in a software driver or other software. A MAC (or a portion thereof) implemented in processor 580 may include one or more roaming timers as discussed herein.

Host memory 590 represents an article that includes a machine readable medium. For example, host memory 590 represents any one or more of the following: a hard disk, a floppy disk, random access memory (RAM), dynamic random access memory (DRAM), static random access memory (SRAM), read only memory (ROM), flash memory, CDROM, or any other type of article that includes a medium readable by host processor 580.

Systems represented by the various foregoing figures can be of any type. Examples of represented systems include computers (e.g., desktops, laptops, handhelds, servers, tablets, web appliances, routers, etc.), wireless communications devices (e.g., cellular phones, cordless phones, pagers, personal digital assistants, etc.), computer-related peripherals (e.g., printers, scanners, monitors, etc.), entertainment devices (e.g., televisions, radios, stereos, tape and compact disc players, video cassette recorders, camcorders, digital cameras, MP3 (Motion Picture Experts Group, Audio Layer 3) players, video games, watches, etc.), and the like.

Roaming timers, processors, wireless network interfaces, and other embodiments of the present invention can be implemented in many ways. In some embodiments, they are implemented in electronics as part of mobile stations for use in wireless networks. In some embodiments, design descriptions of the various embodiments of the present invention are included in libraries that enable designers to include them in custom or semi-custom designs. For example, any of the disclosed embodiments can be implemented in a synthesizable hardware design language, such as VHDL or Verilog, and distributed to designers for inclusion in standard cell designs, gate arrays, or the like. Likewise, any embodiment of the present invention can also be represented as a hard macro targeted to a specific manufacturing process.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A method to initiate roaming in a mobile station, wherein the mobile station is associated with a first access point, the method comprising:
   communicating with the first access point to determine whether to end the association of the mobile station with the first access point and associate the mobile station with a second access point; and
   resetting a roaming timer, wherein the roaming timer is to determine a delay time of associating the mobile station with the second access point.

2. The method of claim 1, wherein resetting the roaming timer comprises resetting the roaming timer responsive to the determination to end the association of the mobile station with the first access point and associate the mobile station with the second access point.

3. The method of claim 1, wherein resetting the roaming timer comprises setting the roaming timer to a value indicating no delay time for associating the mobile station with the second access point; and
   the method further comprising initiating an attempt to associate the mobile station with the second access point in response to setting no delay time of associating the mobile station with the second access point.

4. The method of claim 1, further comprising:
   determining a number of missed beacons from the first access point;
   comparing the number of missed beacons from the first access point with a corresponding threshold; and
   wherein communicating with the first access point to determine whether to end the association of the mobile station with the first access point and associate the mobile station with the second access point comprises comparing the number of missed beacons from the first access point with the corresponding threshold.

5. The method of claim 1, further comprising:
   determining a number of retransmissions of packets or frames to the first access point;
   comparing the number of retransmissions of packets or frames to the first access point with a corresponding threshold; and
   wherein communicating with the first access point to determine whether to end the association of the mobile station with the first access point and associate the mobile station with the second access point comprises comparing the number of retransmissions of packets or frames to the first access point with the corresponding threshold.

6. The method of claim 1, further comprising:
determining a data rate of transmissions of packets or frames to the first access point;
comparing the data rate of transmissions of packets or frames to the first access point with a corresponding threshold; and
wherein communicating with the first access point to determine whether to end the association of the mobile station with the first access point and associate the mobile station with the second access point comprises comparing the data rate of transmissions of packets or frames to the first access point with the corresponding threshold.

7. The method of claim 1, further comprising:
determining an average received signal strength indicator (RSSI) from received packets or frames from the first access point;
comparing the RSSI with a corresponding threshold; and
wherein communicating with the first access point to determine whether to end the association of the mobile station with the first access point and associate the mobile station with the second access point comprises comparing the RSSI with the corresponding threshold.

8. The method of claim 4, further comprising:
determining that the second access point is better than the first access point based on the comparison of the number of missed beacons from the first access point with the corresponding threshold.

9. The method of claim 5, further comprising:
determining that the second access point is better than the first access point based on the comparison of the number of retransmissions of packets or frames to the first access point with the corresponding threshold.

10. The method of claim 6, further comprising:
determining that the second access point is better than the first access point based on the comparison of the data rate of transmissions of packets or frames to the first access point with the corresponding threshold.

11. The method of claim 7, further comprising:
determining that the second access point is better than the first access point based on the comparison of the RSSI with the corresponding threshold.

12. The method of claim 1, wherein the mobile station and the access point are operable in accordance with Institute of Electrical and Electronics Engineers (IEEE) 802.11v and/or IEEE 802.11k.

13. A mobile station comprising:
an omni-directional antenna;
a radio interface coupled to the omni-directional antenna to interact with a first access point; and
a processor coupled to the radio interface, wherein the processor is to:
communicate with the first access point to determine whether to end the association of the mobile station with the first access point and associate the mobile station with a second access point; and
reset a roaming timer, wherein the roaming timer is to determine a delay time of associating the mobile station with the second access point.

14. The mobile station of claim 13, wherein the processor to reset the roaming timer is to reset the roaming timer responsive to the determination to end the association of the mobile station with the first access point and associate the mobile station with the second access point.

15. The mobile station of claim 13, wherein the processor to reset the roaming timer is to set the roaming timer to a value indicating no delay time for associating the mobile station with the second access point; and wherein the processor is further to initiate an attempt to associate the mobile station with the second access point in response to setting no delay time of associating the mobile station with the second access point.

16. The mobile station of claim 13, wherein the processor is to further to:
determine a number of missed beacons from the first access point;
compare the number of missed beacons from the first access point with a corresponding threshold; and
wherein the processor to communicate with the first access point to determine whether to end the association of the mobile station with the first access point and associate the mobile station with the second access point is to compare the number of missed beacons from the first access point with the corresponding threshold.

17. The mobile station of claim 13, wherein the processor is to further to:
determine a number of retransmissions of packets or frames to the first access point;
compare the number of retransmissions of packets or frames to the first access point with a corresponding threshold; and
wherein the processor to communicate with the first access point to determine whether to end the association of the mobile station with the first access point and associate the mobile station with the second access point is to compare the number of retransmissions of packets or frames to the first access point with the corresponding threshold.

18. The mobile station of claim 13, wherein the processor is to further to:
determine a data rate of transmissions of packets or frames to the first access point;
compare the data rate of transmissions of packets or frames to the first access point with a corresponding threshold; and
wherein the processor to communicate with the first access point to determine whether to end the association of the mobile station with the first access point and associate the mobile station with the second access point is to compare the data rate of transmissions of packets or frames to the first access point with the corresponding threshold.

19. The mobile station of claim 13, wherein the processor is to further to:
determine an average received signal strength indicator (RSSI) from received packets or frames from the first access point;
compare the RSSI with a corresponding threshold; and
wherein the processor to communicate with the first access point to determine whether to end the association of the mobile station with the first access point and associate the mobile station with the second access point is to compare the RSSI with the corresponding threshold.

20. The mobile station of claim 16, wherein the processor is to further to:
determine that the second access point is better than the first access point based on the comparison of the number of missed beacons from the first access point with the corresponding threshold.

21. The mobile station of claim 17, wherein the processor is to further to:

determine that the second access point is better than the first access point based on the comparison of the number of retransmissions of packets or frames to the first access point with the corresponding threshold.

22. The mobile station of claim 18, wherein the processor is to further to:
determine that the second access point is better than the first access point based on the comparison of the data rate of transmissions of packets or frames to the first access point with the corresponding threshold.

23. The mobile station of claim 19, wherein the processor is to further to:
determine that the second access point is better than the first access point based on the comparison of the RSSI with the corresponding threshold.

24. The mobile station of claim 13, wherein the mobile station and the access point are to operate in accordance with Institute of Electrical and Electronics Engineers (IEEE) 802.11v and/or IEEE 802.11k.

* * * * *

UNITED STATES PATENT AND TRADEMARK OFFICE
CERTIFICATE OF CORRECTION

PATENT NO. : 8,457,628 B2
APPLICATION NO. : 13/461660
DATED : June 4, 2013
INVENTOR(S) : Jeyaseelan et al.

It is certified that error appears in the above-identified patent and that said Letters Patent is hereby corrected as shown below:

Title page, in column 1, Inventor (75), line 1, delete "L" and insert --L.--, therefor On Title page 1, in column 1, under "Other Publications", line 1, delete "12/868,010 Mailed", and insert --12/868,010, mailed--, therefor On Title page 2, in column 1, under "Other Publications", line 2, delete "201010158602.1 Mailed", and insert --201010158602.1, mailed--, therefor On Title page 2, in column 1, under "Other Publications", line 3, "201010158602.1 Mailed", and insert --201010158602.1, mailed--, therefor On Title page 2, in column 1, under "Other Publications", line 5, delete "10/675,007 Mailed", and insert --10/675,007, mailed--, therefor On Title page 2, in column 1, under "Other Publications", line 8, delete "PCT/US2004/032441 Mailed", and insert --PCT/US2004/032441, mailed--, therefor On Title page 2, in column 1, under "Other Publications", line 10, delete "04789462.1 Mailed", and insert --4789462.1, mailed--, therefor On Title page 2, in column 1, under "Other Publications", line 12, delete "PI 20043464 Mailed", and insert --PI 20043464, mailed--, therefor On Title page 2, in column 1, under "Other Publications", line 14, delete "PI 20043464 Mailed", and insert --PI 20043464, mailed--, therefor On Title page 2, in column 2, under "Other Publications", line 2, delete "200480027133.2 Mailed", and insert --200480027133.2, mailed--, therefor Signed and Sealed this
Twenty-third Day of December, 2014

Michelle K. Lee
*Deputy Director of the United States Patent and Trademark Office*

CERTIFICATE OF CORRECTION (continued)

U.S. Pat. No. 8,457,628 B2

On Title page 2, in column 2, under "Other Publications", line 4, delete "200480027133.2 Mailed", and insert --200480027133.2, mailed--, therefor On Title page 2, in column 2, under "Other Publications", line 6, delete "200480027133.2 Mailed", and insert --200480027133.2, mailed--, therefor On Title page 2, in column 2, under "Other Publications", line 7, delete "10/675,007 Mailed", and insert --10/675,007, mailed--, therefor On Title page 2, in column 2, under "Other Publications", line 9, delete "PCT/US2004/032441 Mailed", and insert --PCT/US2004/032441, mailed--, therefor On Title page 2, in column 2, under "Other Publications", line 11-12, delete "PCT/US2004/032441 Mailed", and insert --PCT/US2004/032441, mailed--, therefor On Title page 2, in column 2, under "Other Publications", line 13, delete "10/675,007 Mailed", and insert --10/675,007, mailed--, therefor On Title page 2, in column 2, under "Other Publications", line 15, delete "10/675,007 Mailed", and insert --10/675,007, mailed--, therefor On Title page 2, in column 2, under "Other Publications", line 17, delete "10/675,007 Mailed", and insert --10/675,007, mailed--, therefor On Title page 2, in column 2, under "Other Publications", line 19, delete "10/675,007 Mailed", and insert --10/675,007, mailed--, therefor On Title page 2, in column 2, under "Other Publications", line 29, delete "PI 20043464 Mailed", and Insert --PI 20043464, mailed--, therefor On Title page 2, in column 2, under "Other Publications", line 30, delete "13/159,785 Mailed", and insert --13/159,785, mailed--, therefor On Title page 2, in column 2, under "Other Publications", line 32, delete "13/159,785 Mailed", and insert --13/159,785, mailed--, therefor On Title page 2, in column 2, under "Other Publications", line 35, delete "201010158602.1 Mailed", and insert --201010158602.1, mailed--, therefor In the Claims In column 9, line 54, in claim 13, after "interface," insert --¶--, therefor In column 9, line 60, in claim 13, after "timer," insert --¶--, therefor